__United States Patent__ [19]

Price-Falcon et al.

[11] 4,246,024

[45] Jan. 20, 1981

[54] METHOD FOR THE GASEOUS REDUCTION OF METAL ORES USING REDUCING GAS PRODUCED BY GASIFICATION OF SOLID OR LIQUID FOSSIL FUELS

[75] Inventors: Juan F. Price-Falcon, Garza Garcia; Enrique R. Martinez-Vera, Monterrey, both of Mexico

[73] Assignee: Grupo Industrial Alfa, S.A., Monterrey, Mexico

[21] Appl. No.: 89,902

[22] Filed: Oct. 31, 1979

[51] Int. Cl.³ .............................................. C21B 13/00
[52] U.S. Cl. .......................................... 75/35; 75/91
[58] Field of Search ................................ 75/34, 35, 91

[56] References Cited

U.S. PATENT DOCUMENTS

| | | | |
|---|---|---|---|
| 1,112,007 | 9/1914 | Hiroth | 75/40 X |
| 3,853,538 | 12/1974 | Nemeth | 75/35 |
| 3,905,806 | 9/1975 | Cruse, Jr. et al. | 75/35 |
| 4,019,724 | 4/1977 | Cruse, Jr. et al. | 75/35 |
| 4,046,555 | 9/1977 | Lange | 75/35 |
| 4,108,636 | 8/1978 | Lange | 75/35 |
| 4,150,972 | 4/1979 | Price-Falcon | 75/35 |

*Primary Examiner*—M. J. Andrews
*Attorney, Agent, or Firm*—Curtis, Morris & Safford

[57] ABSTRACT

A method for the gaseous reduction of particulate ores to metals in a moving bed, vertical shaft reactor using a reducing gas externally supplied from a solid or liquid fossil fuel gasification unit. The reducing gas is reformed in a reforming zone located within the reactor and treated prior to injection into the reduction zone of the reactor. A portion of the reducing gas produced in a coal gasification unit may be used to cool the metal in the cooling zone of the reactor.

8 Claims, 1 Drawing Figure

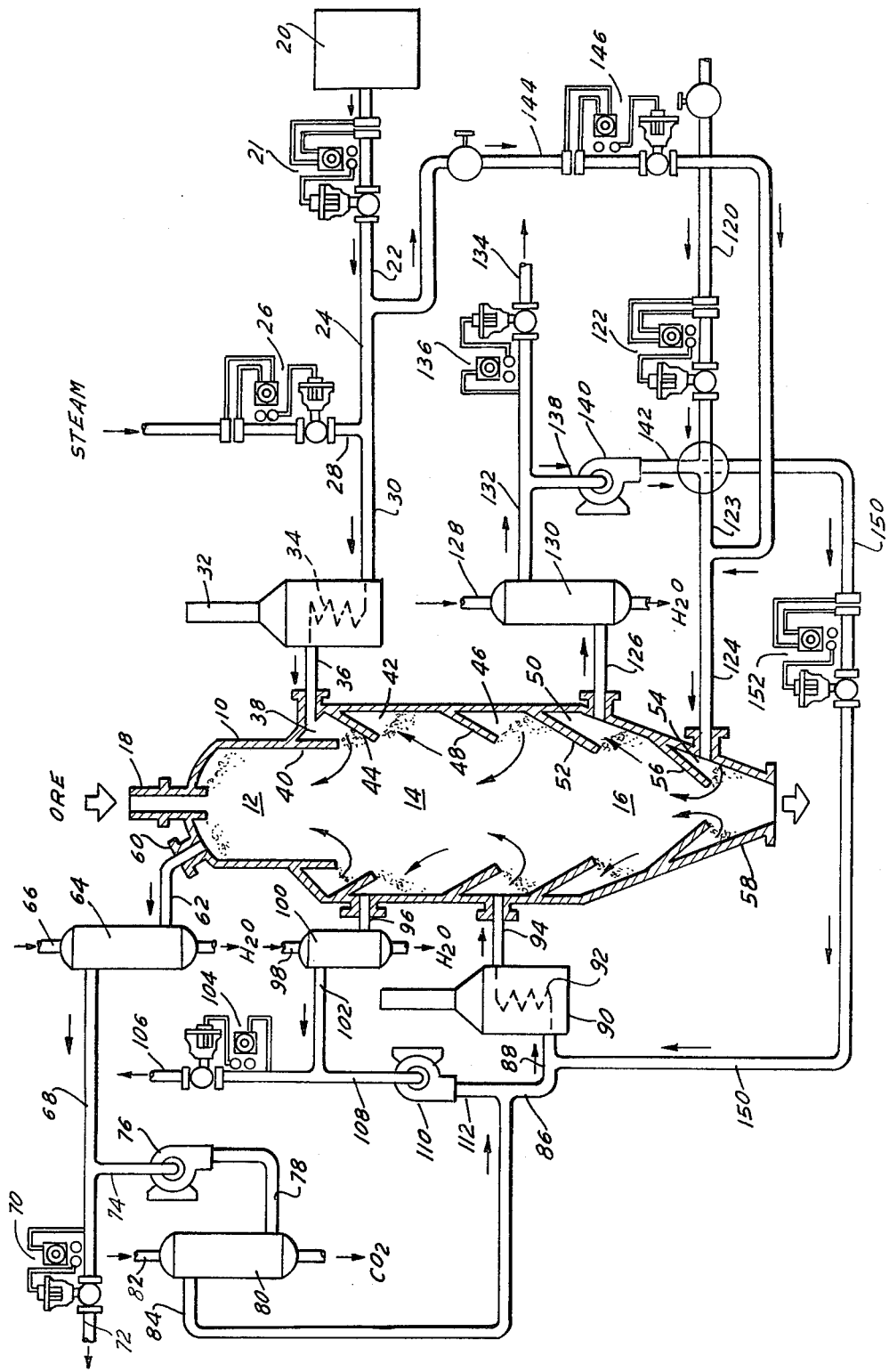

METHOD FOR THE GASEOUS REDUCTION OF METAL ORES USING REDUCING GAS PRODUCED BY GASIFICATION OF SOLID OR LIQUID FOSSIL FUELS

BACKGROUND OF THE INVENTION

This invention relates generally to a method for the gaseous reduction of particulate ores to metals in particulate form in a moving bed, vertical shaft reactor, and more particularly, to a method for the reduction of the ore and the cooling of the resulting metal particles using a reducing gas externally supplied from a solid or liquid fossil fuel gasification unit. This invention is particularly suitable to the reduction of iron ore to sponge iron and is illustratively described with particular reference thereto.

For purposes of describing the present invention the terms "reforming," "reforming zone," etc., specifically refer to chemical reactions whereby the $H_2$ to CO ratio of the reducing gas supplied to the moving bed, vertical shaft reactor is increased.

In general, the production of sponge iron in a typical vertical shaft, moving bed reactor involves two principal steps, namely, reduction of the ore with a suitable hot reducing gas in a reduction zone of the reactor and then subsequent cooling of the resulting sponge iron with a gaseous coolant in a cooling zone of the reactor. The reducing gas is typically a gas largely composed of carbon monoxide and hydrogen injected into the reactor at temperatures in the range of 850° C. to 1100° C., preferably 900° C. to 1000° C. The hot reducing gas may be introduced into the reactor at the bottom of the reduction zone and passed upwardly through the reactor to flow counter-currently to the downwardly moving ore, or alternatively, the hot reducing gas may be introduced at the top of the reduction zone and caused to flow co-currently with the downwardly moving ore. It is well known in the art to cool the sponge iron by injecting a cooling gas at relatively low temperature into the cooling zone of the reactor and passing the cooling gas upwardly through the reactor whereby the cooling gas temperature is increased and the temperature of the sponge iron is reduced.

In previously proposed processes, the reducing gas used in the direct reduction of iron ores has been derived from a number of sources, e.g., the catalytic reforming of hydrocarbons and steam. Systems using natural gas and steam to generate a reducing gas require the use of catalytic reforming units. In prior processes where solid or liquid fuels are used to generate the reducing gas as opposed to those processes which utilize natural gas, additional equipment has been required to enrich the gas so that it may be effectively used for reduction purposes.

SUMMARY OF THE INVENTION

It is accordingly an object of the present invention to provide a metal ore reduction process in which a metal ore, e.g., iron ore, is reduced to sponge metal, e.g., sponge iron, by a reducing gas produced by the gasification of solid or liquid fossil fuels which is reformed within the reactor to increase its reducing efficiency.

It is another object of the invention to provide a reducing gas from a gasification unit which is reformed within the reactor and treated prior to being used to reduce the metal ore.

It is still a further object of the invention to provide a reducing gas with a desirable hydrogen to carbon monoxide ratio which substantially increases the reduction reaction rate of the metal ore and thereby decreases the residence time of the ore through the reactor.

Other objects of the invention will be in part obvious and in part pointed out hereafter.

GENERAL DESCRIPTION

The objects and advantages of the present invention may be generally achieved by providing a reforming zone within the reactor to reform a reducing gas produced in a suitable gasification unit. Since the gas diffusion rate into the ore particles is essentially temperature independent and depends primarily upon the concentration of hydrogen present in the reducing gas, the reducing gas should desirably have a relatively high hydrogen content. In accordance with the invention, a reducing gas which may be prepared by the gasification of coal with oxygen and water vapor is mixed with steam and heated. The heated gas mixture is injected into the reactor and reformed in a reforming zone located in the upper portion of the reactor to produce a higher and more desirable $H_2$ to CO ratio. In the reforming zone the $H_2$ to CO ratio which is typically in the range of about 0.5:1 to 1:1 is raised to a suitable value for iron ore reduction, i.e., in the range of about 2.5:1 to 5:1 by means of the water-gas shift reaction:

$$CO + H_2O \rightarrow H_2 + CO_2$$

The iron-bearing material in the reactor acts as a particularly effective catalyst for this reaction. The composition of a typical effluent gas from a liquid fossil fuel gasifier unit as reported in S. C. Singer, Jr. and L. W. Ternhaar "Reducing Gases by Partial Oxidation of Hydrocarbons," *Chemical Engineering Progress*, Vol. 57, No. 7, (July 1961), pp. 68–74, is as follows:

|  | % Volume, Dry Basis |
| --- | --- |
| $H_2$ | 46.1 |
| CO | 46.9 |
| $CO_2$ | 4.3 |
| $N_2$ | 1.4 |
| $CH_4$ | 0.4 |
| $H_2O$ | 0.9 |
|  | 100.0 |

The composition of a typical effluent gas from a solid fuel gasifier unit as reported in the "Institute of Gas Technology Hydrogen Production From Coal Interim Report Project 8963" presented at N.A.S.A. Marshall Space Flight Center, Alabama, Apr. 24, 1975, and distributed by N.T.I.S. N75-24113, is as follows:

|  | % Volume, Dry Basis |
| --- | --- |
| $H_2$ | 30.4 |
| CO | 58.3 |
| $CO_2$ | 10.0 |
| $N_2$ | 1.0 |
| $CH_4$ | 0.0 |
| $H_2O$ | 0.3 |
|  | 100.0 |

This higher $H_2$ to CO ratio is desirable because the reduction reaction rate using hydrogen is higher than that of carbon monoxide thereby decreasing the residence time of the ore in the reactor. In addition, since a higher amount of CO tends to deposit elemental carbon on the ore, the increased proportion of hydrogen will minimize such deposition. The change in the CO content also allows for better control of carburization.

The reformed gas produced in the upper portion of the reactor is removed from the reforming zone of the reactor to an external loop wherein it is cooled, compressed and caused to flow through an absorption tower to remove carbon dioxide. The reformed and treated gas is then transferred to a heater in which it is heated to an elevated temperature in the range of about 750° C. to 1000° C. after which it is injected into the reduction zone as a reducing gas. The reducing gas passes through the reduction zone of the reactor in contact with the metal ore thereby effectuating a reduction of the ore after which it is removed from the reduction zone and cooled to remove water therefrom. The cooled reducing gas is then combined with the reformed and treated gas stream being recirculated to the reduction zone of the reactor.

While it is known to use a reducing gas produced in a coal gasification system in the direct reduction of metal ores, reforming the gas within the reactor to increase the $H_2$ to CO ratio has not been previously disclosed. Similarly, the method of reforming the reducing gas supplied from a solid or liquid fossil fuel gasification unit within the reactor followed by treating such gas prior to injection into the reduction zone of the reactor has heretofore been unknown in the prior art. The invention provides a method whereby a reducing gas produced in a fuel gasification system can be more efficiently and economically utilized for the reduction of metal ores. Additionally, through this invention the reducing gas is reformed within the reactor thereby eliminating the need for a separate reforming unit or reactor resulting in an energy and capital cost saving.

The many objects and advantages of the present invention can best be understood and appreciated by reference to the accompanying drawing which illustrates a sponge iron production system incorporating several modifications of the invention and comprising a vertical shaft moving bed reactor with a reforming zone located in the upper portion thereof. For purposes of this description the reducing gas is produced in a coal gasification unit.

DETAILED DESCRIPTION OF THE DRAWING

Referring to the drawing, numeral 10 generally designates a vertical shaft, moving bed reactor having a reforming zone 12 in the upper portion thereof, a cooling zone 16 in the lower portion, and a reduction zone 14 located between the reforming and cooling zones. The reactor 10 is suitably heat-insulated and interiorly lined with a refractory material in a manner known in the art.

The particulate ore which is to be treated is introduced into the reactor 10 through a charging pipe 18. The ore charged to the reactor may be in the form of either lumps, pre-formed pellets, or mixtures thereof. Near the bottom of the reforming zone 12, the reactor is provided with an annular plenum chamber 38 which extends around the periphery of the reactor to provide a means whereby a heated gaseous mixture of reducing gas and steam is fed to the reactor. The vertical baffle 40 together with the wall of the reactor defines the annular space 38. The ore moves downwardly through the reforming zone wherein it is heated and partially reduced by the upwardly flowing reformed gas.

The iron ore leaving the reforming zone and entering the reduction zone 14 essentially consists of ferric oxide. Near the bottom of the reduction zone 14 there is a second annular plenum chamber 46, similar to plenum chamber 38, through which reformed and treated reducing gas may be fed into the reactor. A frusto-conical baffle 48 is also provided which together with the wall of the reactor defines the annular space 46.

The iron ore moving downwardly through the reduction zone 14 is reduced by the reducing gas passing through the reduction zone. The reducing gas leaves the reactor through annular plenum chamber 42. The plenum chamber 42 and the frusto-conical baffle 44 are similar to plenum chamber 46 and baffle 48.

As a result of the reduction achieved in the reduction zone, the ore leaving this zone and entering the cooling zone 16 is highly metallized and of low carbon content. Near the bottom of the cooling zone 16 there is another annular plenum chamber 54 through which substantially inert cooling gas can be fed into the reactor if desired. A frusto-conical baffle 56 is also provided similar to baffles 44 and 48. As the sponge iron moves downwardly through the cooling zone 16, it is cooled by the cooling gas flowing therethrough and leaves through the reactor outlet 58.

Turning now to the gas flows in the present system, the reducing gas is produced in a coal gasification unit 20 and flows through pipe 22 at a rate controlled by the flow controller 21 and into pipe 24. Steam flowing through pipe 28 and controlled by flow controller 26 is mixed with the gas from the coal gasification unit 20 and enters pipe 30. The gaseous mixture flows through pipe 30 to a heating coil 34 of a heater 32 wherein it is heated to a temperature in the range of about 300° to 600° C. The heated mixture leaves heater 32 through pipe 36 and flows into the plenum chamber 38. The gas flowing through plenum chamber 38 enters the reactor near the bottom of the reforming zone 12. Upon entering the reforming zone of the reactor, the heated mixture is reformed to obtain a higher and more desirable hydrogen to carbon monoxide ratio. The reformed gas flows upwardly through the reforming zone and is removed near the top of the reactor through an outlet connection 60 and pipe 62.

In one modification of the invention a portion of the reducing gas produced in the coal gasification unit 20 is injected at low temperature into the cooling zone of the reactor to aid in the cooling of the sponge iron. However, if a low carbon content in the sponge iron is desired, a substantially inert gas from a suitable source may be used as the cooling gas. If all or part of the cooling gas supplied to the cooling zone of the reactor is supplied from the coal gasification system, then a portion of the cooling gas effluent from the cooling zone of the reactor may also be transferred to the reduction loop.

The reformed gas leaving the reactor through pipe 62 enters a quench cooler 64 into which water is introduced through pipe 66 to cool and effectuate the removal of water therefrom. The gas leaves cooler 64 through pipe 68 and flows into pipe 74 which connects with the suction side of pump 76. A portion of the gas stream flowing through pipe 68 may flow through pipe 72 to a suitable point of use (not shown). Pipe 72 is provided with a back pressure regulator 70 having an adjustable set point so that it may be adjusted to maintain a desired positive and constant pressure in the system to improve the efficiency of reactor 10.

The gas mixture flowing to pump 76 is discharged through pipe 78 and enters a carbon dioxide absorber 80. The carbon dioxide in the stream entering the absorber 80 is removed by a method known in the art by a suitable absorbing medium entering the absorber 80 through pipe 82. The gas leaving the absorber through pipe 84 contains only small amounts of carbon dioxide. Gas flowing through pipe 84 enters pipe 86 and flows through pipe 88 to the heating coil 92 of heater 90. The gas is heated in heater 90 to a temperature in the range of about 850° to 1000° C. and preferably in the range of 850° to 900° C. The heated gas leaves heater 90 and flows through pipe 94 into plenum chamber 46 through which it enters the reactor near the bottom of the reduction zone 14.

The reducing gas passes upwardly through the reduction zone and flows into plenum chamber 42 through which it leaves the reactor. The reducing gas stream leaves the reactor through pipe 96 and enters the quench cooler 100 into which water is introduced through pipe 98 to cool and effectuate the removal of water from the reformed gas. The gas leaves cooler 100 through pipe 102 and a portion flows through pipe 108 into the suction side of pump 110. A portion of the gas flowing through pipe 102 flows through pipe 106 to a suitable point of use. Pipe 106 is provided with a back pressure regulator 104 having an adjustable set point so that it may be adjusted to maintain a desired positive and constant pressure in the system to improve the efficiency of reactor 10.

The gas flows through pump 110 into the discharge pipe 112 and is mixed with the reformed gas leaving the carbon dioxide absorber 80 through pipe 84. The combined gas stream then flows through pipes 86 and 88, heater 90 and pipe 94 from which it is fed back into the bottom of the reduction zone 14.

The inert make-up gas, preferably nitrogen, may be supplied from a suitable source (not shown) through pipe 120 at a rate controlled by the flow controller 122. The inert gas flowing through pipe 120 then flows through pipe 124 into plenum chamber 54 and into the reactor near the bottom of the cooling zone 16. A frusto-conical baffle 56 together with the wall of the reactor defines the annular chamber 54. The make-up inert gas flows upwardly through the cooling zone 16 of the reactor and is removed through annular chamber 50. The effluent cooling gas flows through pipe 126 into quench cooler 130 into which water is introduced through pipe 128 to cool and effectuate the removal of water in the effluent gas. The gas leaves cooler 130 through pipe 132 and flows into pipe 138 which connects with the suction side of pump 140. A portion of the gas stream flowing through pipe 132 may flow through pipe 134 to a suitable point of use not shown. Pipe 134 is also provided with a back pressure regulator 136 having an adjustable set point so that it may be adjusted to maintain a desired positive and constant pressure in the system to improve the efficiency of reactor 10.

The gas is then discharged by pump 140 through pipe 142 where it may be mixed with make-up inert gas flowing through pipe 120 to enter pipe 123. This gas stream is then recycled back through pipe 124 and plenum chamber 54 into the cooling zone 16 of the reactor. Alternatively, a portion of the gas flowing through pipe 142 is directed to the reducing loop via pipe 150 at a rate controlled by flow controller 152 and mixed with the reformed and treated gas flowing through pipe 86.

It is to be understood that the foregoing description is intended to be illustrative only and that the embodiments described can be modified in various ways within the scope of the invention. For example, a portion of the gas from the coal gasification unit 20 may be caused to flow through pipe 144 at a rate controlled by flow controller 146. The gas then flows through pipe 124 into plenum chamber 54 and into the bottom of the cooling zone 16.

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

We claim:

1. A method for reducing a particulate iron ore to sponge iron in a vertical shaft, moving bed reactor having a reforming zone in the upper portion thereof to which the iron ore is fed, a cooling zone in the lower portion thereof for cooling the sponge iron, and a reducing zone between the reforming and cooling zones for reducing the iron ore to sponge iron which comprises preparing a reducing gas by the gasification of solid or liquid fossil fuels with oxygen and water vapor, mixing the reducing gas with steam, heating the resulting mixture to a temperature in the range of 300° to 600° C., passing the heated mixture through the reforming zone in contact with iron-bearing material therein to reform the gaseous mixture to increase the hydrogen to carbon monoxide ratio thereof, removing the reformed gas from the reforming zone and removing a portion of the carbon dioxide content and using the reformed gas to reduce iron ore in the reduction zone of said reactor.

2. A method according to claim 1 wherein the reduced ore in the cooling zone is cooled by circulating an inert gas therethrough wherein said inert gas is fed to the cooling zone and caused to flow upwardly through said cooling zone of the reactor.

3. A method according to claim 2 wherein the inert gas consists essentially of nitrogen.

4. A method according to claim 1 wherein a portion of the reducing gas at low temperature is fed to the cooling zone of the reactor and passed upwardly through the cooling zone to cool the reduced ore.

5. A method for reducing a particulate iron ore to sponge iron in a vertical shaft, moving bed reactor having a reforming zone in the upper portion thereof, a cooling zone in the lower portion thereof for cooling the sponge iron, and a reduction zone between the reforming and cooling zones for reducing the iron ore to sponge iron which comprises preparing a first stream of reducing gas prepared by the gasification of solid or liquid fossil fuels with oxygen and water vapor, mixing the reducing gas with steam, heating the resulting mixture to a temperature in the range of 300° to 600° C., feeding the heated mixture as a second stream to the reforming zone at a point near one end thereof, passing the gaseous mixture through the reforming zone in contact with iron-bearing material therein to reform the gaseous mixture to increase the hydrogen to carbon monoxide ratio thereof, removing from a point near the other end of the reforming zone the reformed gas as a third stream, cooling the third stream to remove water therefrom to form a fourth stream of essentially hydrogen, carbon monoxide and carbon dioxide, removing at least a portion of the carbon dioxide content of the cooled fourth stream to form a reconditioned reducing gas as a fifth gas stream, heating the fifth stream, and using the reformed and reconditioned gas to reduce iron ore in the reduction zone of the reactor.

6. A method according to claim 5 wherein the reduced ore in the cooling zone is cooled by circulating an inert gas therethrough wherein said inert gas is fed to the cooling zone and caused to flow upwardly through said cooling zone of the reactor.

7. A method according to claim 5 wherein the inert gas consists essentially of nitrogen.

8. A method according to claim 5 wherein a portion of the first stream is fed to the cooling zone of the reactor and passed upwardly through the cooling zone to cool the reduced ore.

* * * * *